United States Patent [19]

Prestridge

[11] 4,056,733
[45] Nov. 1, 1977

[54] PANEL BOARD

[75] Inventor: Floyd L. Prestridge, Tulsa, Okla.

[73] Assignee: Combustion Engineering, Inc., Windsor, Conn.

[21] Appl. No.: 646,220

[22] Filed: Jan. 2, 1976

[51] Int. Cl.² .............................................. H01H 47/04
[52] U.S. Cl. ................................... 307/115; 307/147; 361/166; 340/324 M
[58] Field of Search ............... 307/147, 149, 157, 115; 317/119, 112, 101 CE, 137, 154, 139; 339/18 C; 340/166 EL, 324 M; 200/46, 18; 250/553, 552; 361/166

[56] References Cited

U.S. PATENT DOCUMENTS

| 3,502,945 | 3/1970 | Bentley et al. | 317/139 |
| 3,582,579 | 6/1971 | Ford | 200/18 |
| 3,680,049 | 7/1972 | Tsukada | 250/553 |

Primary Examiner—Robert K. Schaffer
Assistant Examiner—Morris Ginsburg
Attorney, Agent, or Firm—Arthur L. Wade

[57] ABSTRACT

A board of electrical insulating material has power conductors mounted on one side and work circuits mounted on the other side. A power source to actuate the work circuits is connected to the power conductors in a set sequence. Holes are provided through the board to receive conductive pins to electrically connect power conductors to work circuits to actuate each selected work circuit at a predetermined point in the set sequence.

6 Claims, 2 Drawing Figures

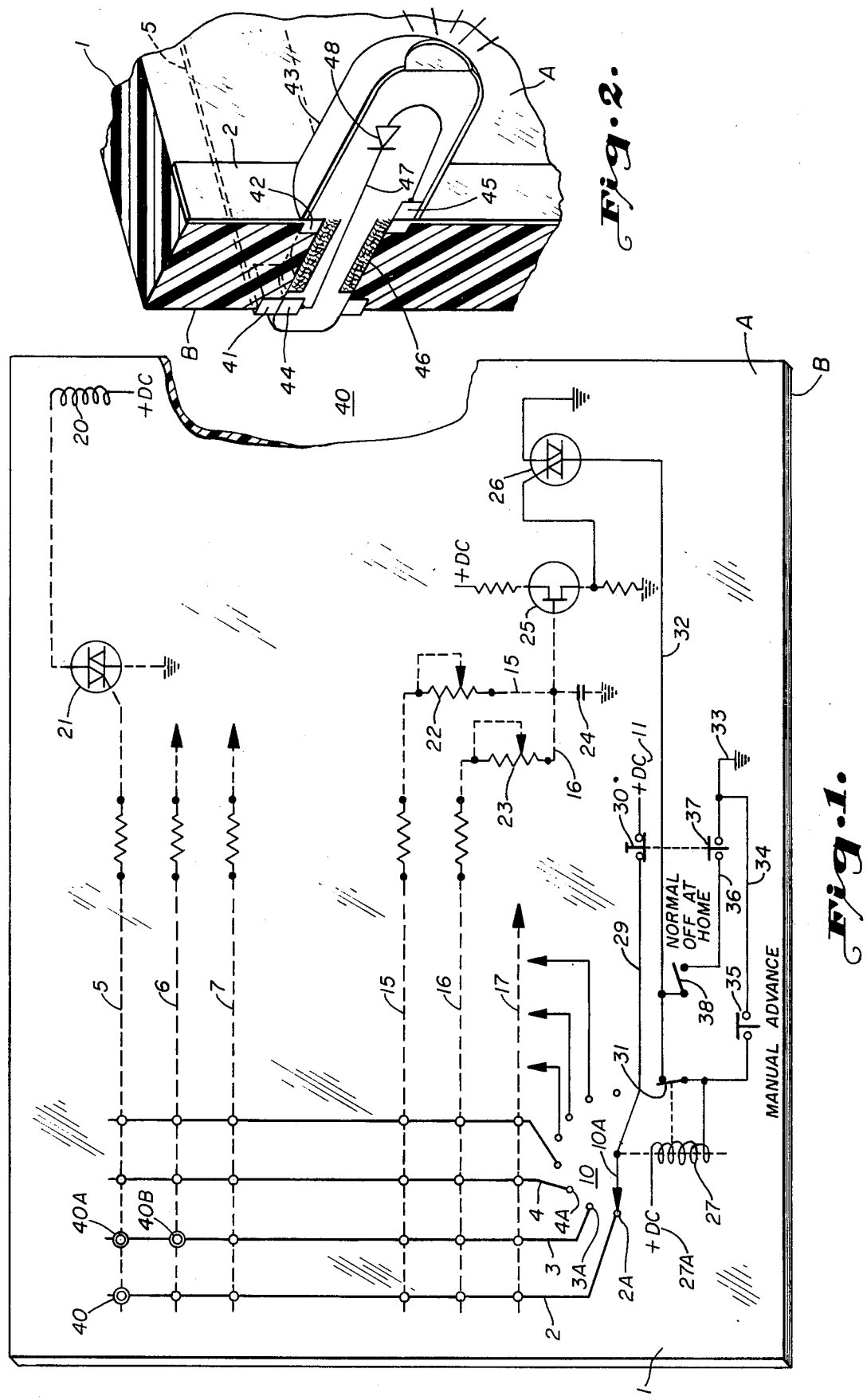

PANEL BOARD

BACKGROUND OF THE INVENTION

1. Field of the Invention

The present invention relates to control systems for plural work circuits. More specifically, the invention relates to a system for manual selection of the number, sequence and dwell time of plural work circuits.

2. Description of the Prior Art

The heart of any system with plural work circuits has always been the panel board. This is the physical location, or station, at which the operating personnel control the system. Indicators, recorders, and control devices are grouped at this single station so the personnel can monitor and change the process controlled by the work circuits.

Of course there are many different electrical circuits which can link the indicators, recorders and control devices. The general result is a wiring system of bewildering complexity which requires patient tracing by personnel, from a diagram, to trouble-shoot malfunctions or make changes in the sequence, timing and selection of work circuits as may be required from time to time.

Simplicity is always welcome in this art. The art will never be exhausted by invention which gives simplification. The present invention is an important forward stride in both simplicity and flexibility. The technical beauty of this novel contribution will readily unfold through the following disclosure.

SUMMARY OF THE INVENTION

A principle object of the present invention is to manually connect any of a plurality of electrical work circuits to each contactor of a multiple-position switch.

Another object of the invention is to manually select the dwell time for any position of the multiple-position switch.

Another object is to electrically limit each manually selected circuit actuated at its connection to a position of the multiple-position switch to prevent undesired actuation of other circuits.

The present invention contemplates a multiple-position switch with each of its contactors connected to one of a plurality of first conductors having sections in a common plane and extended parallel to each other. A low-power source of electrical energy is connected to the switch arm which engages the contactors. A series of second conductors have sections in a common plane and extended parallel to each other and in proximity to the parallel sections of the first conductors. A work circuit is connected to each of the series of second conductors. A manually positionable conductive element is provided for electrically connecting any of the first conductors with any of the second conductors so any number of the work circuits can be actuated by the low-power source at any position of the switch arm.

The present invention also contemplates a series of third conductor with sections in the same plane and parallel to the series of second conductor sections. A time-delay circuit is connected to each of the third conductors. Manually positionable conductive elements are provided to electrically connect a time-delay circuit for each switch arm position. And for control of the advancement of the multiple-position switch.

The present invention also contemplates that the manually positionable conductive elements each include in their electrical connection a rectifier which prevents the power source actuating work circuits other than the one connected to the power with the positionable conductive element.

Other objects, advantages and features of this invention will become apparent to one skilled in the art upon consideration of the written specification, appended claims, and attached drawings, wherein:

FIG. 1 is a front elevation of a panel board in which the present invention is embodied; and FIG. 2 is a perspective of a portion of the board of FIG. 1, disclosing the manually positioned, electrically conductive, pin connecting circuits through the board.

DESCRIPTION OF THE PREFERRED EMBODIMENT

Although the broad concept of the invention is simple and easy to understand, the embodiment could give the appearance of a scope to the invention which is more narrow than conceived by the inventor. Therefore, a discussion of alternate structure used to embody the invention is in order to preserve the full scope of the invention.

Conductors mounted on both sides of an insulating panel board will be disclosed. It must be clear that the invention contemplates any and all forms for conductors. They could be in the form of printed circuit on the surface of the board. This may be preferable. However, they could also be given the form of wires pinned in various ways to the surface of the board.

Next are the electrically conductive elements thrust through holes in the board to connect the conductors on one side to the conductors on the other side. Simple pins with a press fit in the holes may be the preferred form and arrangement. However, a switch structure at each possible connection point may be used, thrusting the equivalent of the manual pin through the board for connection.

Next is the sequencing mechanism which applies electrical power in prescribed order to conductors on one side of the board. The well-known stepping switch may be an obvious choice. This form will be disclosed. However, there are also solid-state units which carry out an equivalent function. Therefore, the terms "contactor" and "switch arm" are to be given the breadth they should have under the circumstances. We are speaking of a structure to which a source of electrical power is connected. The structure applies this power to a series of stations, or positions, in a prescribed sequence. The assumption is that the terms "contactor" and "switch arm" are not limited to the solenoid-driven stepping switch. They are also applied to a solid-state structure which may not have the equivalent of moving parts visible on the stepping switch.

Finally, there is the nomenclature of the circuit actuated by the power source when connected through the multiple-position switch. Obviously it is desirable to carry a low-level of electrical power on the multiple-position switch; arcing is to be avoided as a source of wear. The circuit to which this low-level power is applied can be connected to the gate of an electronic switch which controls a significant amount of power applied to a working relay circuit. This brings us to the entire circuit actuated by the original source of low-level power. The complete circuit, from low-level power to the gate of the electronic switch to the high-level power to the relay, will all be swept into the term "work" circuit. The work circuit will be actuated by the multiple-position switch and through manually positioned conductive elements.

Having hopefully established enough firm benchmark nomenclature, the disclosure of the drawings can be considered. FIG. 1 discloses a panel board 1 on whose side A is mounted a plurality of first conductors 2, 3 and 4. Each of the first conductors has a section extended vertically in FIG. 1 and all sections are parallel to each other.

On side B a plurality of second conductors 5, 6 and 7 is mounted. Each of the second conductors has a section extended horizontally and parallel to each other. Obviously the first conductors are in the plane of side A and the second conductors are in the plane of side B, the first and second conductor sections extending at a right angle to each other.

Other drawing conventions could be used, but FIG. 1 was selected to disclose the panel board in front elevation, side A toward the viewer. The first conductors, 2, 3 and 4 represent any number of conductors to which electrical power is connected. The only limitation on the number of first conductors is the numerical capacity of the multiple-position switch. However, three of these first conductors are adequate to indicate this feature of the embodiment.

It was decided to disclose the second conductors 5, 6 and 7 on side A of the panel board in the hidden line convention. It is then clear that each of the first conductors 2, 3, 4, etc., intersect each of second conductors 5, 6, 7, etc. At, or closely adjacent, each intersection is a hole through the panel. A suitable electrical contact at each end of each hole is formed and arranged to receive an electrically conductive pin in a press fit. The contact at each end of each hole is permanently connected to the conductor on its side of the board. Therefore, when the pin is manually positioned through the hole it electrically connects a first conductor to a second conductor.

Multiple-position switch 10 is mounted on board 1 with its contactors connected to the first conductors. The switch arm is connected to a low-level of d.c. voltage source 11. Therefore, as the switch arm is carried to each contactor, the d.c. voltage source is applied to those work circuts which have been manually pinned to the first conductor which is permanently connected to the contactor to which the switch arm is carried.

Here is the first disclosure of flexibility. It does not take a high order of intelligence to visually trace each conductor 2, 3, 4, etc., upward as it intersects each conductor 5, 6, 7, etc. The question is how many work circuits are to be actuated at each position of the switch arm of switch 10? The answer is to simply connect them by a conductive element which is manually placed in position through the board 1. The next question is how long is it required for the switch arm of switch 10 to dwell at each contactor?

Refer back to FIG. 1 where a plurality of third conductors are disclosed as extending sections 15, 16, and 17 horizontally on the side B. These sections form a third group beneath the second conductors. Work circuits are connected to sections 15, 16 and 17, but they are circuits whose work performed is to advance switch 10 from one contactor to another. Further, these particular work circuits determine how long the arm of switch 10 will remain at each contactor.

Additional flexibility of the system is now apparent. Not only can an operator plug in the work circuit actuated at each position of the arm of switch 10 but the time-delay for actuation. Both functions are readily planned and executed by use of the visual display provided by board 1 and the conductor sections mounted on its sides A and B. The remainder of the disclosure becomes details beneath these overall concepts.

WORK CIRCUITS

It was generally disclosed that conductors 5, 6, 7, etc., are actuated by low-level d.c. voltage source 11 to carry out a work function. Where electric circuits are concerned, a simple form of its work finds example in a solenoid switch actuation. All manner of valves and control devices can be regulated by simple solenoid switches.

In FIG. 1 coil 20 is disclosed as connected in circuit with a power source through electronic switch 21. When switch 21 is conductive, coil 20 is energized by the power source. Coil 20 is the primary element of a solenoid switch. It follows that work is carried out when electronic switch 21 is rendered conductive.

Electronic switch 21 is embodied in the now well-known TRIAC. When the gate of 21 has a d.c. voltage applied to it, TRIAC 21 becomes conductive. This simple picture should now be clear. When the d.c. voltage source 11 is connected to conductor 5, through switch 10 and a conductive element, work is carried out by repositioning the solenoid of coil 20.

TIME DELAY CIRCUITS

Referring again to conductors 15, 16 and 17, it can be observed that each of these conductors is connected to an adjustable resistance. They are then connected to a common capacitor. Two of these time delay work circuits are completed to disclose this feature of the embodiment. Therefore, conductor 15 includes adjustable resistance 22 and conductor 16 includes adjustable resistance 23. Both conductors are, in turn, connected to capacitor 24. Although common capacitor 24 is used, each of these time delay circuits is separately adjustable through resistances 22 and 23 to generate an output voltage which increases at a predetermined rate.

The outputs of the time delay circuits are applied to a unit 25 which becomes conductive at a predetermined value of this applied voltage. When 25 becomes conductive its arrangement in the circuit generates an output to the gate of a unit 26 which, in turn, renders unit 26 conductive. A relatively low power generated the gate voltage of unit 26. However, unit 26 is in a circuit with whatever relatively high power is required to actuate coil 27 and move the arms of switch 10.

The overall function of each time delay circuit which can be manually selected for any position of the multiple position switch should be clear. The selection is by manual pin. Specifically, when the switch 10 arm is moved to its contactor which has been manually selected for the time delay circuit of conductor 15, adjustable resistance 22 will cause its output voltage to increase at a predetermined rate. When the predetermined output voltage level is reached, coil 27 is connected to a source of power to advance the switch arm to the next contactor. The flexibility in selection of the dwell time for switch time at each contactor should now be evident.

INTERIM SUMMARY

An interim review of the structure and function of the embodiment may be unnecessary. However, the concept can be emphasized to advantage.

Switch 10 is disclosed in three essential elements. Switch arm 10A is mechanically arranged to pivot in sequential engagement of contactors 2A, 3A, 4A, etc. The arm 10A is mechanically moved with the power generated by coil 27 when its circuit is completed between electrical source 27A and a ground.

The first of the contactors may be termed the "home" position of arm 10A. The complete cycle of switch 10 functions may be planned from this "home" position.

As arm 10A is moved through its sequence, it is normally expected to be electrically connected to the source of relatively low electrical power 11. Conductor 29 represents this normal connection and contains switch 30. One skilled in the art can readily trace the circuits which are completed with source 11 as arm 10A engages each contactor of switch 10. Actuation of the work circuits connected to each power circuit is evident when conductive pins are positioned through the board 1. The dwell time of arm 10A at each contactor is determined by which time delay work circuit is pinned to the power circuit of each contactor.

I do not wish to beat these points to death. However, I also do not want the beautiful simplicity of the disclosed concepts expressed by the embodiment to be skimmed over by casual reading of this disclosure.

MANUAL CONTROL OF SWITCH 10

The advancement of switch arm 10A has been disclosed as made when device 26 is made conductive by a gate voltage generated by the time delay circuit. Care should be exercised to not regard this specific circuit disclosed as limiting the invention in any way.

Unit 26 is disclosed as in the form of a TRIAC. Unit 21 is similar to unit 26. Once a gate voltage of the TRIAC renders the unit conductive, the TRIAC remains conductive with a d.c. plate voltage even though the gate voltage is removed. Therefore, the output circuit must be broken to return the TRIAC to its nonconductive state.

If we want to use the TRIAC for the link between the time delay circuit and switch coil 27, the circuit must be broken to have the coil 27 step arm 10A from one contactor to the next. Switch 31 is installed in conductor 32 and is indicated in the drawing as mechanically linked to the switch mechanism moved by the force generated by coil 27.

Switch 31 is normally closed. As coil 27 is pulsed by the conduction of TRIAC 26 it mechanically opens switch 31. The circuit of coil 27 is broken. The output circuit of TRIAC 26 is broken. TRIAC 26 is rendered non-conductive. At the same time arm 10A has been advanced one contactor.

It must be understood that the use of switch 31 is merely evidence that the circuit of coil 27 is designed to be actuated through TRIAC 26. It is evident that other electronic switches can be employed in place of TRIAC 26 to react to a pulse of voltage from the time delay circuits by becoming conductive and returning to a non-conductive state without breaking the output circuit. This fact should be obvious to one skilled in the art but I wish no misunderstanding on the point.

If arm 10A is in the middle of its cycle of the contactors and it is desired to return it to the "home" position, two choices are provided. First, remember that any connection of coil 27 with ground will advance arm 10A.

Examine the disclosure. Ground 33 is provided. Conductor 34 electrically connects ground 33 with source 27A through coil 27 and switch 35. Switch 35 is normally open. Manual closure of switch 35 energizes coil 27 and advances arm 10A one contactor. Thus is provided the means of manually pumping arm 10A through its cycle. However, note that in moving arm 10A in this manner source 11 remains connected to arm 10A and this might be undesirable.

A means to return arm 10A to the "home" position and disconnect source 11 while doing so is provided. Note conductor 36 is also electrically connected to ground 33 and 27 through switch 27, switch 38, and switch 31. At the same time switch 37 is mechanically connected to switch 30. Switch 30 is normally closed. Switch 37 is normally open. A final mechanical arrangement; switch 38 is mechanically connected to arm 10A in such way that switch 38 is opened only when arm 10A is at the "home" contactor.

The utility of this arrangement may be now evident to one skilled in the art. Certainly it is evident that manual closure of switch 37 and opening of switch 30 at the same time will connect ground 33 to coil 27 through both switch 30 and switch 38 when arm 10A is away from "home". Arm 10A will then automatically advance until the home contactor is reached. Switch 38 will open and disconnect coil 27 from ground 33.

THE MANUAL PINS

The disclosure now comes to a climax with the structure and function of the pins with which the embodiment comes alive. Broadly, it has been explained where and how the pins function at each cross-over, intersection, of the first and second conductor sections to electrically connect power conductors to work circuits. The positions are shown in FIG. 1, on board 1, at each conductor section intersection. All the hardware at the positions is the same, ready to receive pins. In FIG. 1, the best that could be done to represent this pin receptacle is a simple circle. FIG. 2 is used to show the fixture in further detail, engaging a pin.

FIG. 2 represents one of the positions with a pin in place. To keep orientation, position 40 in FIG. 1 is arbitrarily selected to get into the detail of this disclosure. FIG. 2 represents the fragment of board 1 which includes this position 40.

FIG. 2 is a sectioned perspective. Conductor section 2 is easy to find in FIG. 2. Also conductor section 5 is easy to find. Both conductors are provided an electrical contact section formed about the hole through board 1. Contact section 41 is shown on conductor 5. Contact section 42 is on conductor 2. The pin makes an electrical connection between these sections 41 and 42.

We now come to the pin 43. The operator of the panel has access to a box of these pins to make the various connections which his process requires. The sizes of the pin 43 and the sections 41, 42 are arranged so there will be a snug press-fit between the pin and panel hole at the position. When one of these pins is in position on the board, it will be held firmly and when switch 10 applies the power of source 11 to conductor 2, the work circuit connected to conductor 5 is energized and the pin emits light. This light gives the information to the panel operator that work he selected by the pin insertion is being carried out.

It is difficult to show the literal construction of pin 43 and teach the invention clearly. FIG. 2 is the best result lengthy study of the problem could produce. Essentially, the pin has contactors 44 and 45 which electrically, and mechanically, engage sections 41 and 42 when pin 43 is in position. Insulation between 44 and 45 is indicated at 46. The necessary electrical path within pin 43, between contactors 44 and 45, is indicated at 47. Finally, in the conductive path 47, 48 functions as a rectifier and light emitting diode. The exact shape, or form, of these components of pin 43 is up to the design choice of the average engineer. The relative positions of contactors 44–45, insulation 46, electrical path 47 and diode 48 are disclosed here. The disclosure may be somewhat diagrammatic, but it is certainly clear enough. The precise form can be left to the designer.

Note well that diode 48, as a rectifier, serves a dual purpose. Its emmission of light is valuable for the visual information of its operator. However, it also prevents the energization of a work circuit prematurely. This function will be evident when it is realized that a pin connecting a work circuit could be a conductive path from source 11 when pins are placed to form a path other than the path directly established for that particular work circuit. For example, with pins at position 40, 40A and 40B without rectifiers the work circuit of conductor 6 would be actuated with arm 10A at contactor 2A. However, with the pin at 40A including a rectifier, current could not flow in the conductor 6 until arm 10A reached contactor 3A.

CONCLUSION

It has now been fully described how a plurality of first conductors are mounted on a support with each conductor having a section parallel to the other sections. A plurality of second conductors are also mounted on the suport and in a second plane parallel to the plane of the first conductors. A multiple-position switch cycles through the first conductors to connect a source of electrical power to each first conductor in turn.

A work circuit is connected to each of the second conductors. When a conductive element is manually positioned to electrically connect a first conductor to a second conductor, actuation of the work circuit takes place from the source to the first conductor.

From the foregoing, it will be seen that this invention is one well adapted to attain all of the ends and objects hereinabove set forth, together with other advantages which are obvious and inherent to the apparatus.

It will be understood that certain features and sub-combinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A control system, including,
a plurality of first conductors mounted on a support with each conductor having a section extended parallel to the sections of the remaining conductors,
a plurality of second conductors mounted on the support with each conductor having a section extended parallel to the sections of the remaining conductors and a constant distance from all sections of the first conductors,
a plurality of third conductors mounted on the support with each conductor having a section extended parallel to the sections of the remaining conductors and a constant distance from all sections of the first conductors,
a multiple-position switch mounted on the support with each of its contactors electrically connected to one of the first conductors,
an advance mechanism including a switch arm element for cycling the switch to each of its contactors,
a source of electrical power connected to the switch arm element,
a first work circuit connected to each of the second conductors,
a second work circuit connected between each of the third conductors and the advance mechanism of the multiple-position switch and including a manually adjustable time delay system which determines time dwell of the switch at that one of the first conductors connected to one of the third conductors,
a first conductive element which is manually positioned through the support to electrically connect one of the first conductor sections with one of the second conductor sections,
and a second conductive element which is manually positioned through the support to electrically connected one of the first conductor sections with one of the third conductor sections.

2. The control system of claim 1 in which,
the first conductor sections are in a first plane on the support and the second conductor and third conductor sections are in a second plane on the support and parallel to the first plane and the constant distance from the first plane.

3. The control system of claim 2 in which,
the first conductor sections are mounted on one side of a board of insulating material as the support and the second conductor and third conductor sections are mounted on the other side of the board.

4. The control system of claim 3 in which,
the first conductor sections are extended at a right angle to the second conductor and third conductor sections.

5. The control system of claim 4 in which,
the conductive elements are each in the form of a pin and are manually thrust through a hole in the board in electrically connecting a first conductor to a second and third conductor.

6. The control system of claim 5 in which,
the conductive paths of the pins between the conductor section each include a rectifier which limits the direction of current flow to between the source and the work circuits connected to the first conductor.

* * * * *